(12) United States Patent
Mueller et al.

(10) Patent No.: US 6,738,556 B1
(45) Date of Patent: May 18, 2004

(54) SUPPORTING STRUCTURE FOR OPTICAL FIBER FIXING AND SUBMICRON FINE ALIGNMENT

(75) Inventors: Peter Mueller, Baar (CH); Bernd Valk, Unterlunkhofen (CH)

(73) Assignee: Bookham Technology PLC, Abingdon (GB)

( * ) Notice: Subject to any disclaimer, the term of this patent is extended or adjusted under 35 U.S.C. 154(b) by 104 days.

(21) Appl. No.: 10/110,949

(22) PCT Filed: Oct. 25, 2000

(86) PCT No.: PCT/IB00/01530

§ 371 (c)(1),
(2), (4) Date: Jul. 16, 2002

(87) PCT Pub. No.: WO01/35141

PCT Pub. Date: May 17, 2001

(51) Int. Cl.[7] .................................................. G02B 6/42

(52) U.S. Cl. ........................................ 385/137; 385/91

(58) Field of Search ............................ 385/91, 90, 137, 385/136, 52

(56) References Cited

U.S. PATENT DOCUMENTS

| 5,570,444 | A | * | 10/1996 | Janssen et al. ................. 385/90 |
| 5,619,609 | A | * | 4/1997 | Pan et al. ..................... 385/136 |
| 5,963,695 | A | * | 10/1999 | Joyce ........................... 385/88 |
| 6,511,236 | B1 | * | 1/2003 | Webjorn et al. ............... 385/91 |
| 6,516,130 | B1 | * | 2/2003 | Jang ............................ 385/136 |

FOREIGN PATENT DOCUMENTS

JP 2002-323644 A * 11/2002

* cited by examiner

*Primary Examiner*—Mike Stahl
(74) *Attorney, Agent, or Firm*—Renner, Otto, Boisselle & Sklar LLP

(57) ABSTRACT

The invention relates to a clip for holding an optical fiber which is enclosed in a fiber support tube, with respect to an optical source. The clip provides a rigid front part and a flexible back part in one single structure. This specific structure allows fixing and precise adjustment of the optical fiber alignment in a fully automated process in relatively few steps. No parts matching and multiple part handling are required when this clip is used, and final fine adjustment can be achieved by laser hammering and/or re-bending. The support tube is laser welded to the clip.

10 Claims, 5 Drawing Sheets

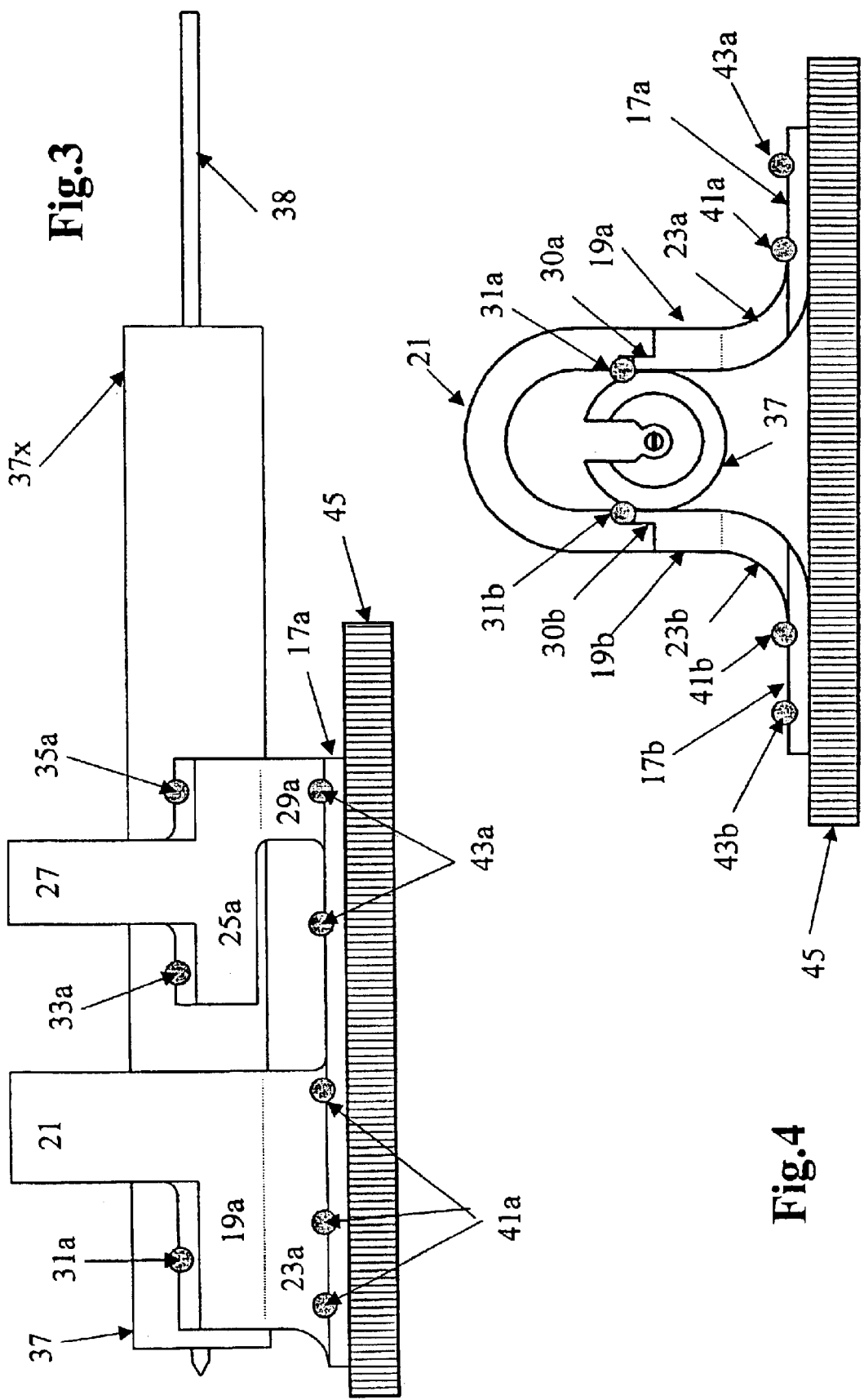

SUPPORTING STRUCTURE FOR OPTICAL FIBER FIXING AND SUBMICRON FINE ALIGNMENT

FIELD OF INVENTION

Present invention is related to fiber-optical transmission devices, and more particularly to a clip structure for fixing an optical fiber with respect to an optical source such as a laser diode.

BACKGROUND AND PRIOR ART

In many modem communication networks, signals are transmitted in optical form through fibers for communication. Furthermore, optical fibers are the preferred medium to transport light from a source to the location of interaction with matter, e.g. fiber optical amplifiers, laser welders, etc. Important parts of these networks and devices are the arrangements where an optical signal, generated in a laser light source, is coupled into the transmission fiber. Optical coupling arrangements therefore have received much attention, because the energy lost in the coupling process should be minimal. Furthermore, the fabrication of such devices which have very small dimensions and tolerances is a complicated and delicate task.

In these devices, the fiber tip must be held very tightly in place with respect to the optical source. On the other hand, they must still leave the possibility to fine tune the fiber position during mounting in order to achieve maximum transfer of the optical energy into the fiber.

Several devices and methods were suggested and are used for adjusting and fixing the fiber in optical transfer modules. Many of them provide a holding member for the fiber, which is fixed to a ground plate, and to which a tube or sleeve enclosing the fiber end is fixed by spot welding using lasers as energy source.

In U.S. Pat. No. 4,837,768 issued to P. Schmid a laser module and a method for coupling an optical fiber thereto are disclosed. A mounting block is provided which has an opening (a bore) for a fiber end sleeve. Separate holders are placed over the sleeve at the front and rear ends of the mounting block, and in sequential adjustment steps the holders are fixed to the mounting block and then to the fiber sleeve by soldering or laser welding. Disadvantages of this method and arrangement are the facts that the fiber sleeve must be introduced into the mounting block (bore), and that several separate parts, i.e. the holders and the mounting block, must be attached and kept in place during fixing.

A method of optically coupling optical fibers to injection lasers is described in U.S. Pat. No. 5,570,444 to Janssen and Donaldson. A slotted rod is provided for holding the fiber with a special fillet of solder. This slotted rod in turn is fixed by welding spots to slide members close to its front end and to a saddle part at its back end. All these parts, in particular the slide members, must be accuately positioned and held in place and separately fixed during the alignment (adjustment) process which is difficult and time consuming because of the various separate entities involved.

Another approach is disclosed in U.S. Pat. No. 5,619,609 to Pan et al. entitled "Fiberoptic Support Clip". The clip constitutes a channel into which the fiber sleeve is inserted from above and then, after optical adjustment, fixed by laser welding to the top edges of the walls of the channel. It appears that after initial placement of the fiber sleeve on the fiber, the sleeve must be removed and then inserted again for proper fiber adjustment and clip placement. This increases cycle time during manufacturing. Furthermore, fine adjustment after clip placement might be difficult because of the so-called slip friction.

Generally the known fiber fixing devices and methods have stringent tolerance requirements on high precision parts, or require pre-weld forming, or selection of mating parts for tight fit. All these facts are inherently increasing production time and manufacturing costs.

OBJECTS OF THE INVENTION

It is an object of the invention to devise a fiber holding device which consists essentially of a single structure. A further object is to provide a fiber holding device which does not necessarily require small tolerances but still allows precise adjustment and fixing of the optical fiber in relatively few steps.

The invention for achieving this object, as defined in the claims, is a fiber holding clip for fixing an optical fiber secured in a fiber support tube, with respect to a light source, having a rigid front part and a flexible back part, so that for adjusting the position of the fiber tip, the flexible back part can be deformed to move the fiber with the fiber support tube while in the rigid front part a pivot point is available; a further aspect of the invention is an optical module subassembly for holding an optical fiber secured in a fiber support tube, with respect to a light source, the subassembly comprising a clip consisting of two fiber holding parts—a rigid front part and a flexible back part —on common base flanges, wherein welding spots fixing the base flanges to a mounting plate are specifically arranged to increase stability at the rigid front part and to increase flexibility at the flexible back part of the clip.

This allows, in particular, fast part handling as well as easy adjustment and fixing of the optical fiber in an optical coupling module, in a completely automated process. The resulting optical fiber holding assembly is mechanically stable.

With the invention, it is also possible to use the known method of laser hammering for fine adjustment of the fiber after placement (aligning) and initial fixing.

Use of the inventive fiber clip results in very precise and stable alignment between fiber tip and laser light source. No parts matching and multiple part are necessary. Therefore the invention allows module packaging with high yield and high reliability, enables high throughput of the assembly station, and results in a decrease of manufacturing cost. No removal or displacement of the fiber after alignment is necessary for clip loading. The structure allows two methods for fine alignment: Laser hammering and re-bending. The bending mainly takes place in the clip and not in the fiber support tube which otherwise could lead to reliability problems in the solder zone of the support tube.

LIST OF DRAWINGS

The invention will now be explained in more detail with reference to an embodiment illustrated in the accompanying drawings. The figures are diagrammatic and not drawn to scale, for greater clarity.

FIG. 3 is a side view of the inventive clip with an inserted fiber support tube, showing the locations of weld spots for fixing of the clip to the base plate of the optical module (subassembly), and showing additional weld spot locations where the fiber tube is fixed to the clip after adjustment;

FIG. 4 is a front view of the inventive clip with an inserted fiber support tube, also showing the locations of weld spots for fixing the clip to the base plate and for fixing the fiber support tube to the clip;

DETAILED DESCRIPTION

A) Specific Clip Structure

Figure 1:
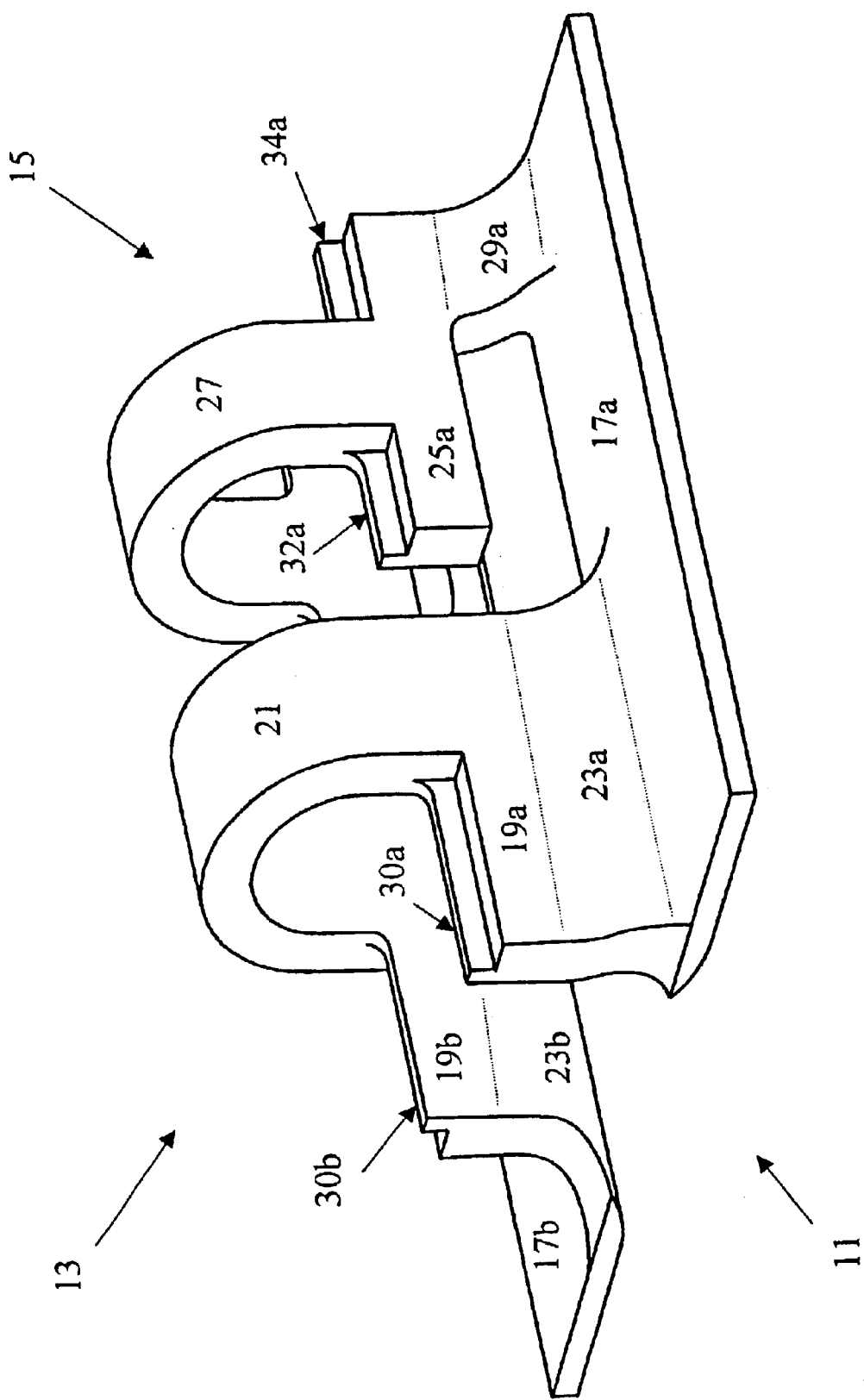
FIG. 1 is a perspective view of the basic structure of the inventive fiber holding clip.

In FIG. 1 the whole fiber holding clip structure 11 is shown. It comprises a rigid front part 13 and a flexible back part 15, both on common base flanges 17a and 17b. Front part 13 includes two side walls 19a and 19b for holding the fiber support tube (37 in FIG. 2 and FIG. 3). These side walls are connected to each other by arch segment 21, and they are connected to respective base flanges 17a and 17b by curved connecting portions 23a and 23b.

The back part 15 includes also two side walls 25a and 25b for holding the fiber support tube (37). These side walls are connected to each other by arch segment 27, and they are connected to the base flanges 17a and 17b by curved connecting portions 29a and 29b, respectively. It should be noted that the length, in longitudinal direction, of connecting portions 29a/b is much shorter than that of connecting portions 23a/b, so that the front part 13 is relatively stiffly fixed to the base flanges, whereas the back part 15 can be bent by plastic deformation of the curved connecting portions 29a/b. The upper surfaces (facets) of side walls 19a/b and 25a/b have narrow edges 30a, 30b (front part) and 32a, 32b, 34a, 34b (back part) to which the fiber support tube can be fixed by spot welding. Clip portions which are symmetrical pairs are designated by number suffixes a and b (e.g. 25a and 25b). Some of them are hidden in the drawing (e.g. 25b). Therefore it should be noted that the clip structure and fixing points are completely symmetrical with respect to the longitudinal axis of the clip.

In FIG. 2, FIG. 3, FIG. 4, and FIG. 5 the clip with an inserted fiber support tube 37 (holding optical fiber 38) is shown in four different views. These figures also show the weld spots where the fiber support tube is fixed to the clip In FIG. 3, FIG. 4, and FIG. 5 there is additonally shown a base plate 45 (of the optical subassembly) to which the base flanges of the clip are fixed by weld spots in a particular arrangement. Indicated on the side wall edges of the clip are weld spots 31a/b, 33a/b and 35a/b at which the fiber support tube (37) is fixed to the side walls by laser welding. It can now be seen from the illustrations in the drawings that, when the fiber tube is fixed to the side walls of the clip in a first adjustment step, then a further, final fine adjustment of the fiber position is possible in the following way: While the rigid front part 13 serves as pivotal area, the fiber support tube can be moved by bending the flexible back part 15, deforming the curved connecting portions 29a/b. Thus, the fiber tip can be moved very precisely in respect to the laser diode (not shown in the drawing) after the weld spots 31a/b, 33a/b and 35a/b have been made.

In present example of the clip structure, the curved connecting portions 23a/b for holding side walls 19a/b of rigid front part 13 have the same length (in longitudinal direction) as these side walls. The curved connecting portions 29a/b for holding side walls 25a/b of the flexible back part 15 have a length (in longitudinal direction) which is only a fraction (e.g. one quarter) of the length of the respective side walls 25a/b. Arch segment 27 interconnecting side walls 25a/b of the flexible back part 15 is located in the middle of the side wall length to allow welding spots (e.g. 33a and 35a) for fiber tube fixing on narrow edges (e.g. 32a and 34a) on both sides of this arch segment 27. In particular, weld spots 35a/b on these narrow edges of the flexible back part 15 are located just above the connecting portions 29a/b so as to have the best bending effect on them when the fiber support tube 37 is gripped at its far end (37x, close to back portion 15) and slightly moved for final adjustment.

Thus, an important aspect of the invention—for allowing a fast and precise adjustment of the fiber position—is the specific, one-piece structure of the clip with a relatively stiff, rigid front part, and a flexible back part easily modifiable by plastic deformation of the connecting portions joining it to the common base flanges.

Exemplary dimensions of the clip and its various portions are as follows: Length ca. 3 mm . . . 5 mm; width ca. 3 mm . . . 5 mm; height depending on distance between weld platform and optical axis; thickness of side walls ca. 0.1 mm . . . 0.5 mm.

B) Fixing of Fiber Holding Clip to Module Base Plate

Another aspect of the invention is the pattern of the weld spot locations for fixing the base flanges 17a/b of the clip 13 to a base plate 45 of the fiber holding subassembly of the optical module. This is shown in particular in FIG. 5.

Figure 5:
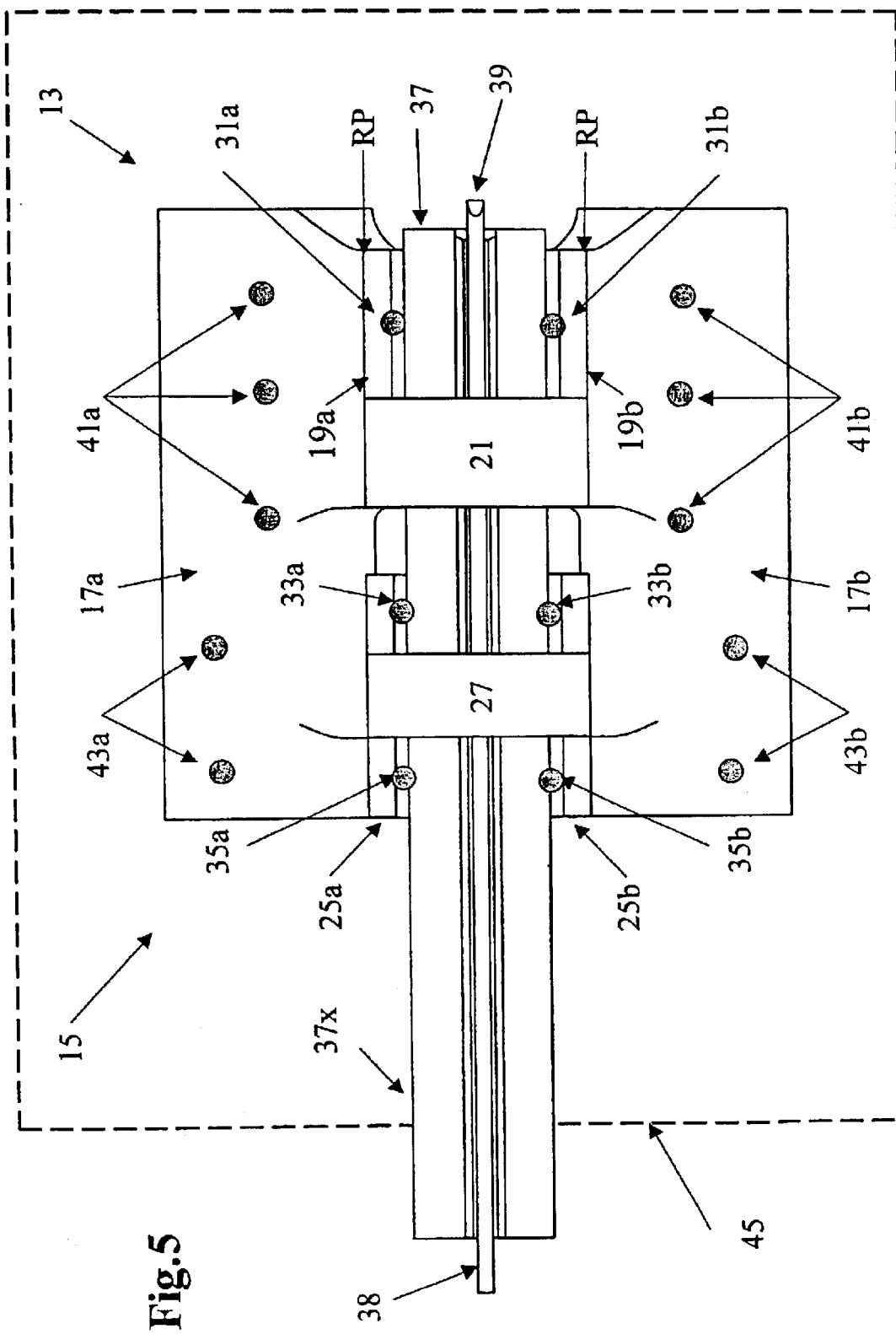
FIG. 5 is a top view of the inventive clip with an inserted fiber support tube, also showing the locations of weld spots for fixing the clip to the base plate and for fixing the fiber support tube to the clip.

FIG. 5 depicts the clip 11 with base flanges 17a/b, side walls 19a/b and 25a/b, and arch segments 21 and 27, and the inserted fiber support tube 37. The right side of FIG. 5 shows the rigid front part 13 (comprising portions 19a/b and 21), the left side of FIG. 5 shows the flexible back part 15 (comprising portions 25a/b and 27). Situated between side walls 19a/b and 25a/b and below arch segments 21/27 is fiber support tube 37 holding in its center the optical fiber 38 of which the fiber tip (front end) 39 is shown that will be placed close to the light source.

The weld spots for fixing the clip structure to the module's base plate 45 are located on the base flanges 17a/b and are shown as circles 41a, 41b and 43a, 43b, respectively. In the front half of the clip, i.e. the region of the rigid front part 13, weld spots 41a/b are situated together in a row relatively close to the side walls 19a/b. This will hold the front part 13 tightly in place which is desired because a pivotal point for fiber support tube movement is thus more stable. In the back half of the clip, i.e. in the region of the flexible back part 15, there are fewer weld spots 43a/b, and they are located more remote from the side walls 25a/b than is the case for the weld spots 41a/b (with respect to their neighboring side walls). This allows easier movement of the far end (37x) of the fiber support tube 37 by deformation of the curved connecting portions 29a/b of back part 15.

Also shown in FIG. 5 are the weld spots 31a/b, 33a/b and 35a/b by which the fiber support tube 37 is fixed to the clip 11, or more precisely to the thinner portions (narrow edges 30a/b, 32a/b, and 34a/b) of the upper facets of side walls 19a/b and 25a/b. Reference will be made to the figures in the following description of the procedure for clip fixing and fiber alignment.

Figure 2:
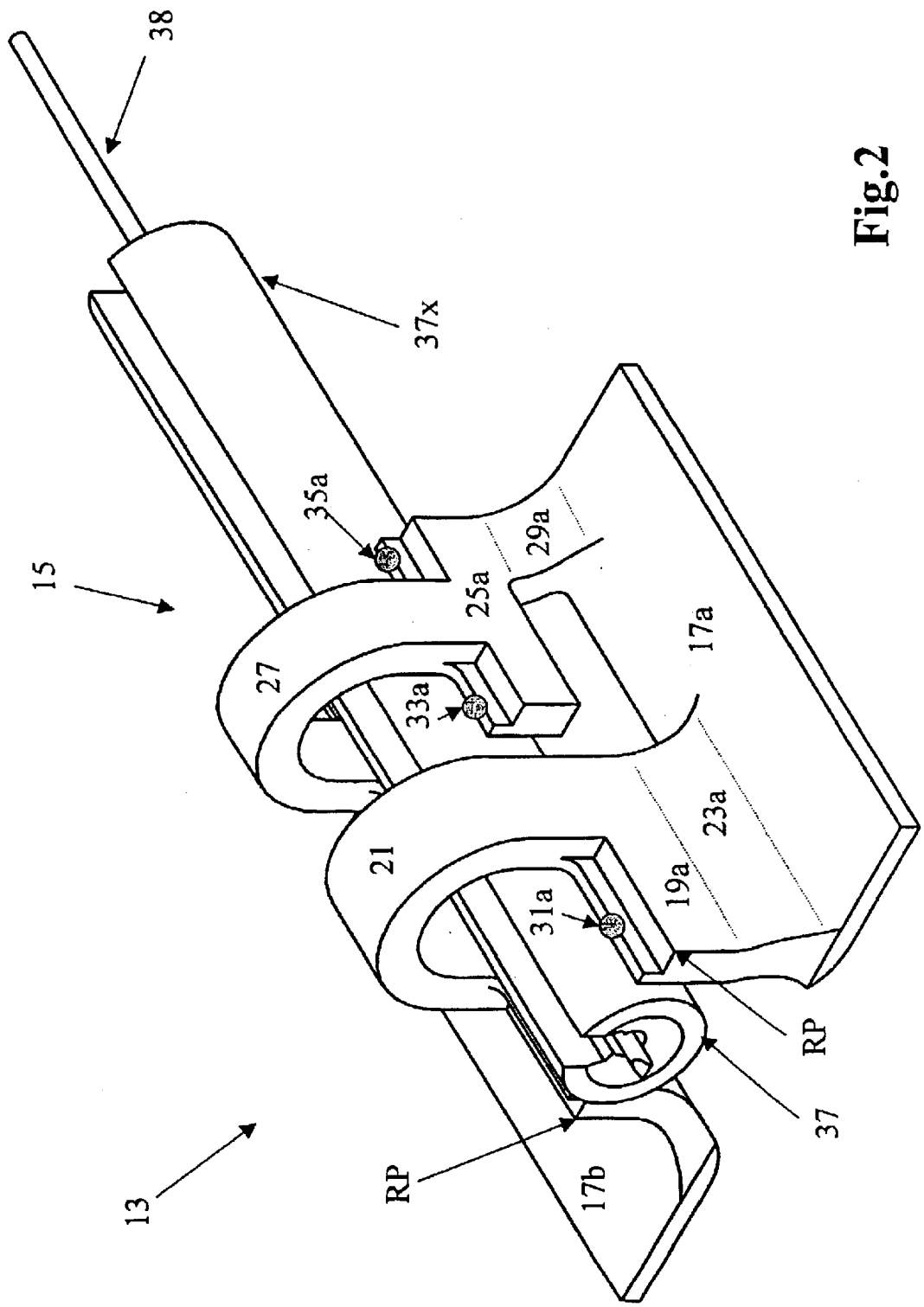
FIG. 2 is a perspective view of the inventive fiber holding clip with an inserted fiber support tube (holding the optical fiber), also showing locations of some of the weld spots for fixing the fiber support tube to the clip.

It should be noted that at the back part 15, weld spots 35a/b are located above connecting portions 29a/b, to support the efficiency of bending the connecting portions 29a/b when slightly moving the far end 37× of fiber support tube 37 for final fine adjustment (cf. FIG. 2 and FIG. 3).

All weld spots are laterally symmetrically situated with respect to the fiber axis, to avoid lateral bending.

C) Procedure for Fiber Fixing and Alignment by Welding

Figure 6:
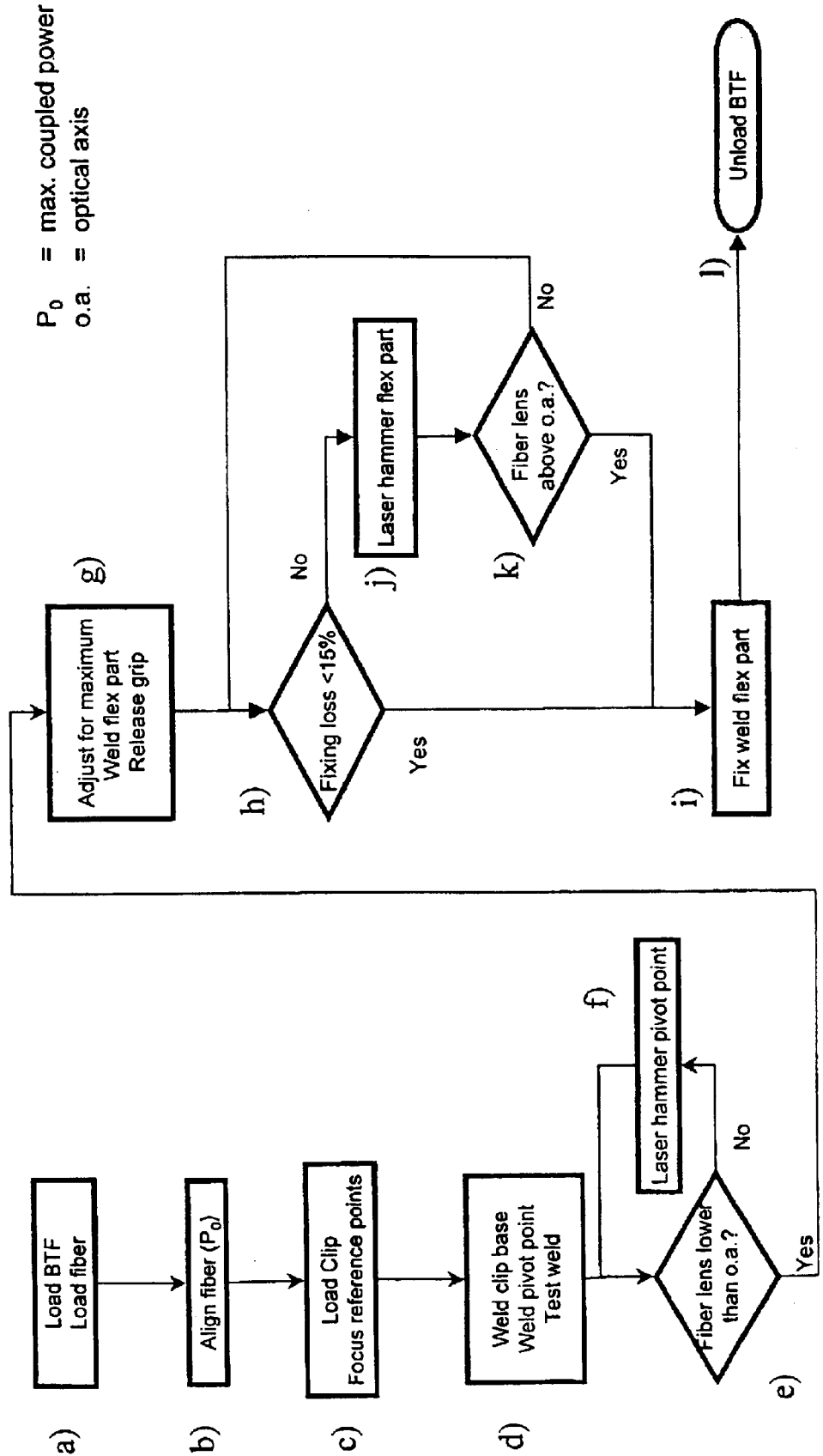
FIG. 6 is a flow diagram of the whole adjustment procedure during mounting of the fiber holding clip and the fiber.

One possible example of the process steps for fiber fixing and alignment with—the above described fiber holding clip—is shown in the flow diagram of FIG. 6. Following steps are executed in the initial fixing procedure:

a) The optical module BTF is loaded and then the fiber with enclosing support tube are grasped with gripping tweezers.

b) The fiber tip is aligned with respect to the light source (laser diode). The achieved maximum coupled optical power is denoted with $P_O$.

c) The clip (11, FIG. 1) is loaded and placed over the fiber support tube. The welding lasers are then focussed to the reference points (as indicated by marks RP in FIG. 2 and FIG. 5). All the weld spots will be made relative to these reference points.

d) The base flanges 17a/b are welded at spots 41a/b and 43a/b (FIG. 3, FIG. 4, FIG. 5) to the subassembly's base plate 45. Thereafter, the fiber support tube 37 is welded at spots 31a/b to the side walls of the clip, to constitute a pivot point in the rigid front part 13. A test weld (spots 31a/b) is made to e) detect whether the lens at the fiber tip 39 is lower than the optical axis. If not, then the fiber is moved by f) laser hammering the pivot point (spots 31a/b). When the fiber lens is finally lower than the optical axis, then the next step is performed.

g) The fiber tip is again adjusted for maximum optical output power by moving the far end of the fiber support tube, to correct large x-shifts during the initial welding sequence. The fiber support tube is then fixed to the back part of the clip (flexible part) at weld spots 35a/b. Thereafter, the fiber support tube is released from the gripper mechanism.

h) A measurement is made whether the power loss caused by the fixing procedure is less than e.g. 15% (comparison to initially achieved maximum power $P_O$).

i) If the fixing loss is less than 15%, it is possible to secure the fiber support tube by welding it to the back part (flexible part) of the clip at weld spots 33a/b.

j) If the fixing loss is larger than 15%, the fiber tip is moved by laser hammering at the back part of the fiber support tube (spots 35a/b). The resulting pivoting ratio between the pivot weld and these hammer welds is ca. 1:5. This allows relatively rough laser hammering powers resulting in a small and controllable movement of the fiber tip.

k) If thereafter, the fiber tip has not yet moved past the optical axis, the procedure loops back to step h). Otherwise, step i) is executed.

l) After securing the fiber support tube to the flexible back part in step i), the fiber fixing subassembly of the optical fiber module is unloaded and ready for heat treatment.

D) Procedure for Final Fine Alignment (by Plastic Deformation)

After a heat treatment of the welded subassembly, the fiber tip has to be moved to its optimum position (i.e. maximum possible coupled output power) by bending. This is done by plastic deformation of the curved connecting portions 29a/b of flexible back part 15. In order to do this, the optical module BTF is loaded again and the fiber support tube is loosely grasped around its very back end (37×) with gripping tweezers. Alternately in x-direction and y-direction, the fiber support tube is first touched by the gripper walls, then moved to the position of maximum coupled power and subsequently plastically deformed to freeze this position. This procedure will be repeated until the coupled power is more than e.g. 95% of $P_O$ (i.e. until the fixing loss is less than −0.25 dB).

Achievable Results:

All the above process steps for fiber fixing and alignment can be excuted fully automatic so that when using the inventive fiber holding clip structure, the whole process will be very time-efficient.

Statistical relevant quantities of samples using the inventive fiber clip show a fixing accuracy of less than 0.2 $\mu$m (equals a fixing loss of less than −0.5 db) for ~93% and less than 0.1 $\mu$m (less than −0.25 db) for ~80% of the samples.

What is claimed is:

1. A fiber holding clip in an optical module for holding an optical fiber secured in a fiber support tube adjustable with respect to a light source, said clip comprising two fiber support tube holding parts (13, 15) on a common base essentially consisting of two parallel flanges (17a, 17b) extending along said fiber support tube (37), a first, essentially stiff holding part (13) located close to the fiber's light entry point, said first holding part being designed to serve as pivot point when said fiber support tube (37) is adjusted, a second, deformable holding part (15) located downstream of said first holding part, said second holding part allowing adjustment of said fiber support tube (37) essentially perpendicular to said fiber's optical axis, and a mounting plate (45) to which said common base is mounted by a plurality of base welding spots (41a, 41b, 43a, 43b) located such that rigidity in the area of the first, essentially stiff holding part (13) is increased, whereas rigidity in the area of the second, deformable holding part (15) is decreased.

2. The fiber holding clip according to claim 1, wherein the base welding spots (41a, 41b) in the area of the first, stiff holding part (13) are positioned close to the side walls of said holding part thus increasing rigidity, and the base welding spots (43a, 43b) in the area of the second, deformable holding part (15) are positioned more remote from the side walls of that back part thus increasing deformability.

3. The fiber holding clip according to claim 1 wherein each of the holding parts (13,15) comprises a pair of two parallel, opposite side walls (19a, 19b; 25a, 25b) of equal length for holding the fiber support tube (37), the side walls of each said pair are interconnected by a respective arch segment (21, 27), and the side walls on each side of said clip are connected to the base flange (17a, 17b) by a respective connecting portion (23a, 23b, 29a, 29b).

4. The fiber holding clip according to claim 3, wherein the connecting portions (23a, 23b) of the first, stiff holding part (13) have about the same length as the respective side walls, thus achieving rigidity, whereas the connecting portions (29a, 29b) of the second, deformable holding part (15) have each only a fractional length of the respective side wall, thus achieving flexibility.

5. The fiber holding clip according to claim 3, wherein each of the side walls (19a, 19b, 25a, 25b) has a narrow protruding edge (30a, 30b, 32a, 32b, 34a, 34b) to which a fiber tube can be attached by spot welding (31a, 31b, 33a, 33b, 35a, 35b).

6. The fiber holding clip according to claim 3, wherein the position and/or width of the arch segment (27) Interconnecting the side walls (25a, 25b) of the second, deformable holding part (15) leaves an upper facet (34a) at the far end of each side wall (25a) above the position of the respective connecting portion (29a), so that moving the far end of the fiber support tube (37) effects deformation of said connecting portion (29a).

7. The fiber holding clip according to claim 3, wherein the arch segment (21) connecting the side walls (19a, 19b) of the first, stiff holding part (13) is shorter than the respective connecting portions (23a, 23b), leaving one upper facet (30a, 30b) on each side wall to which the fiber support tube (37) is fixed by a weld spot (31a, 31b), and the arch segment (27) connecting the side walls (25a, 25b) of the second, deformable holding part (15) is shorter than the respective connecting portions (29a, 29b), leaving at least one upper facet (32a, 34a) at each said side wall (25a) to which said fiber tube (37) is attached by at least one weld spot (33a, 35a).

8. The fiber holding clip according to claim 3 wherein the arch segment (21) of the first, stiff holding part (13) is wider than the arch segment (27) of the second, deformable holding part (15).

9. The fiber holding clip according to claim 2 wherein each of the holding parts (13,15) comprises a pair of two parallel, opposite side walls (19a, 19b; 25a, 25b) of equal length for holding the fiber support tube (37), the side walls of each said pair are interconnected by a respective arch segment (21, 27), and the side walls on each side of said clip are connected to the base flange (17a, 17b) by a respective connecting portion (23a, 23b, 29a, 29b).

10. The fiber holding clip according to claim 7, wherein each side wall (25a) of the second holding part (15) comprises two upper facets (32a, 34a) to which said fiber tube (37) is attached by two weld spots (33a, 35a).

* * * * *